United States Patent Office 2,843,137
Patented July 15, 1958

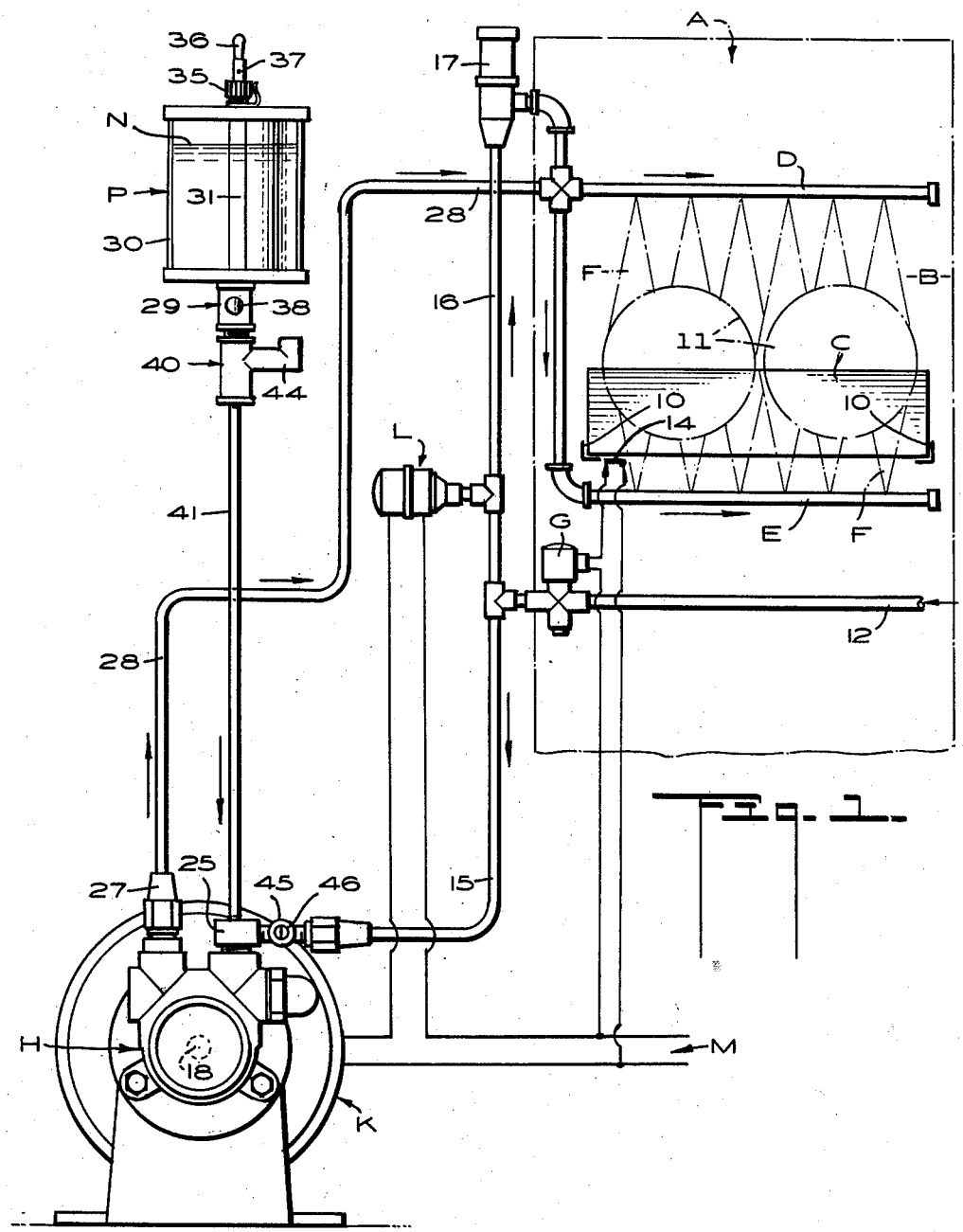

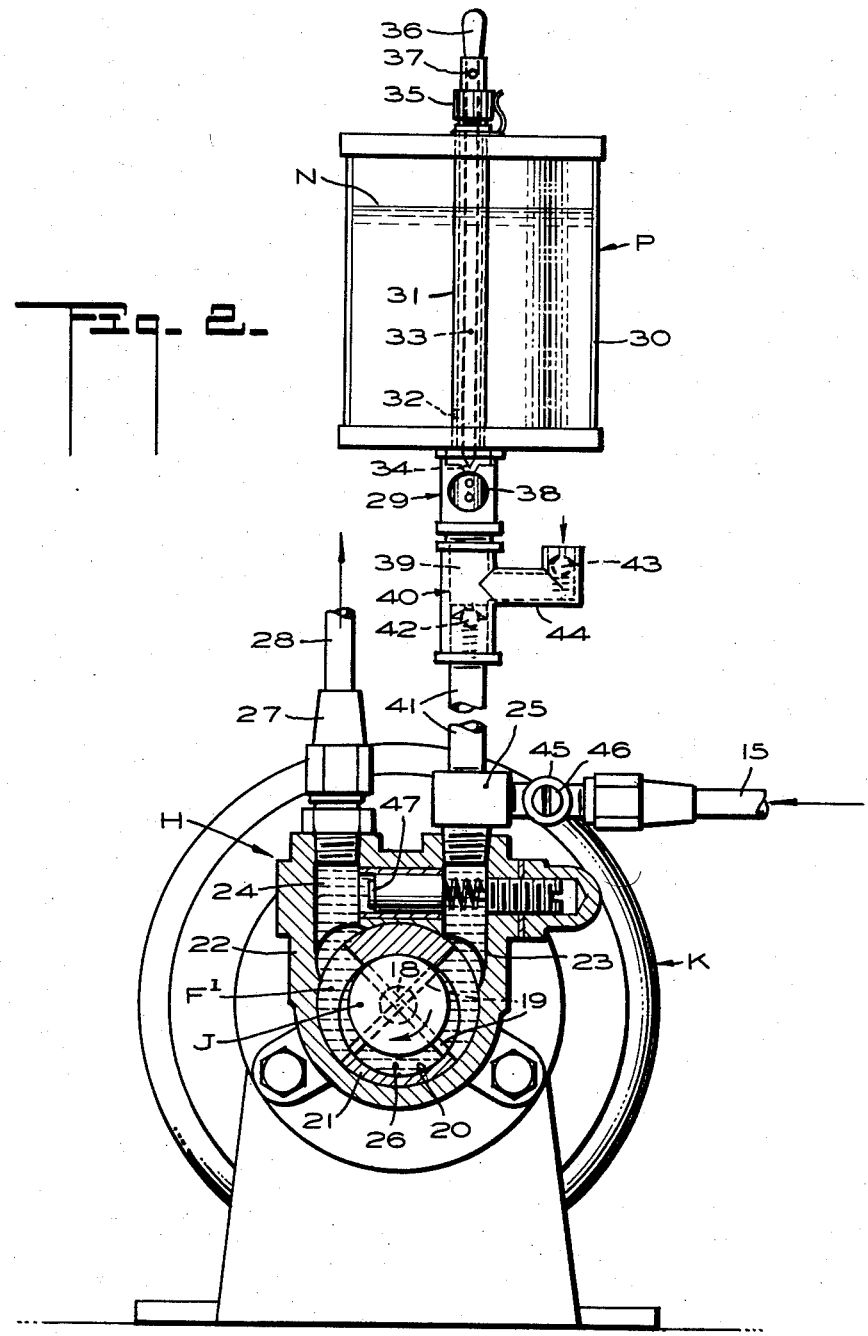

2,843,137

MOTOR-ACTUATED APPARATUS FOR INJECTING DRYING AGENTS INTO A RINSE-SPRAY SYSTEM

George Joseph Federighi and Tore H. Noren, San Francisco, Calif.

Application March 22, 1956, Serial No. 573,291

4 Claims. (Cl. 134—57)

The present invention relates to a motor-actuated apparatus for injecting drying agents into a rinse-spray system. It embodies improvements over the apparatus shown in our United States Letters Patent No. 2,740,415, dated April 3, 1956.

It is a well-known fact that in conventional dishwashing machines, as used commercially in hotels and restaurants, rinse spray water of about 180° Fahrenheit is discharged over the dishes, glasses and silverware to rinse and sterilize them. This rinse water has a tendency to cling to the washed articles, forming small droplets, which leave white spots or streaks when they dry.

In order to overcome the foregoing deficiency, resort has been made to injecting a non-sudsing drying agent into the rinse spray, in sufficient quantities to break the surface tension of the water, thus allowing the rinse water to drain from the washed articles.

An object of our invention is to provide a motor-actuated apparatus, which includes a pump having a mixing chamber through which part of the hot incoming rinse water is by-passed. In connection therewith, we make use of a dispenser that is arranged to feed a regulated quantity of a non-sudsing drying agent to the chamber of the pump, wherein the agent is thoroughly mixed with the by-passed rinse water, prior to delivery of the latter over the articles to be rinsed.

Moreover, we propose to provide a dispenser which is designed to feed the drying agent to the mixing chamber of the pump in droplet form, thereby assuring a thorough mixing of the drying agent with the rinsing water. Also, we propose to provide a simple and yet efficient means for regulating the proportion of the drying agent relative to the amount of the by-passed rinse water.

Other objects and advantages will appear as the specification continues. The novel features will be set forth in the claims hereunto appended.

*Drawings*

For a better understanding of our invention, reference should be had to the accompanying drawings, forming part of this application, in which:

Figure 1 is a schematic elevational view, disclosing our motor-actuated apparatus as being coupled to the rinse-spray system of a dishwashing machine; and Figure 2 is an enlarged elevational view of the dispenser and the motor-actuated pump, the latter being shown in section.

While we have shown only the preferred form of our invention, it should be understood that various changes, or modifications, may be made within the scope of the annexed claims without departing from the spirit thereof.

*Detailed description*

Referring now to Figure 1 of the drawings, we have disclosed a conventional dishwashing machine A, which defines a rinse compartment B through which a dish-carrying basket C may be moved. In following the usual practice, this basket has been shown as being supported by and movable along a pair of guide rails 10 so as to pass between upper and lower rinse-spray nozzles D and E, respectively, thus allowing the dishes 11, glasses or silverware, to be subjected to the cleaning and sterilizing action of the hot rinse water F.

For the purpose of delivering the hot rinse water to the dishwashing machine, an inlet pipe 12 has been provided. This pipe may lead from any suitable source of hot water to a normally-closed solenoid valve G. When the basket C is actually disposed in the rinse compartment B, the basket is adapted to close a switch 14 to thereby open the valve G, allowing part of the hot water to flow through a branch pipe 15 to a pump H. The remainder of the hot water will flow through a pipe 16 to a vacuum breaker 17 for delivery to the rinse-spray nozzles D and E.

Of course, the pump H may be made of any suitable design. For this purpose, we have selected a conventional pump for illustration, which includes an impeller J that is driven by the shaft 18 of an electric motor K. This impeller is provided with reciprocable vanes 19, which are arranged to maintain contact with the bore 20 of a liner 21. The latter is mounted in the pump housing 22, and the bore 20 is arranged eccentrically relative to the shaft 18.

As shown in Figure 2, inlet and outlet ports 23 and 24, respectively, are formed on opposite sides of the pump housing. When the impeller is rotated in a clockwise direction, by-passed rinse water $F^1$ will be drawn from the pipe 15, which will flow through a fitting 25 and the inlet port 23, and will enter a mixing chamber 26. This chamber is defined by the impeller J and the liner 21. As the impeller continues to turn, this by-passed rinse water will flow through the outlet port 24 and a fitting 27. The latter has a pipe 28 connected thereto for conveying the by-passed water $F^1$ to the rinse-spray nozzles D and E.

It will be noted that a pressure switch L is coupled into the pipe 16 so that the pressure of the water in this pipe will connect the motor K to a suitable source M of electrical energy. Thus, whenever the solenoid valve G is open so as to allow rinse water to flow through the pipes 15 and 16, the motor will be operating.

For the purpose of injecting regulated amounts of a drying agent liquid N into the pump H for mixing with the rinse water $F^1$ therein, we have provided a dispenser P. This dispenser is mounted on a tubular support 29, and defines a reservoir 30 in which a supply of the drying agent liquid is disposed. The liquid used for this purpose may be a commercial product known as "Rinse-Dry," which is composed of a non-ionic alkyl aryl sulfonate wetting agent and alcoholic solvent for blending.

As shown in Figure 2, the reservoir 30 has a central outlet tube 31, which is fashioned with an opening 32 near its lower end for receiving the liquid N from the reservoir. A needle valve 33 is mounted in this tube and may be moved away from a valve seat 34 by adjusting a knurled nut 35. It will be seen that a handle 36 is operatively connected to the upper end of the needle valve 33 by a pin 37. When this handle extends vertically, as in both Figures 1 and 2, the needle valve is open. However, when the handle 36 is swung into a horizontal position, the valve 33 will close upon its seat 34.

With respect to the tubular support 29, it is provided with a sight glass 38 so that the amount of discharge of the drying agent liquid N from the reservoir 30 to the interior of this tubular support may be observed. The nut 35 may be adjusted to regulate the discharge of the drying agent. The latter drops into the interior compartment 39 of a substantially T-shaped fitting 40. As will be noted, the fittings 25 and 40 are interconnected by a pipe 41.

During operation of the pump H, the suction created thereby will unseat a normally closed check valve 42, which is housed in the fitting 40. This will allow the drying agent liquid N to descend from the compartment 39 to the inlet port 23, where this liquid will mix with the by-passed rinse water $F^1$.

In order to prevent the liquid N from being drawn in a stream into the pump, we have provided an air inlet check valve 43 in the branch leg 44 of the fitting 40. When this check valve is opened, due to the suction created by the pump H, sufficient air will be admitted from the atmosphere to the compartment 39 so that the liquid N will descend drop-by-drop to the pump. This is an important feature of our apparatus, because the best results will be obtianed when the drying agent liquid is mixed by drops with the hot rinse water $F^1$ in the mixing chamber 26 of the pump.

For the purpose of establishing the proper amount of suction in the pipe 41, a water-feed adjustment 45 is provided in the pipe 15. By turning the valve 46 of this adjustment a differential in pressure is created within the pipes 15 and 41, establishing a suction in the latter so as to open the check valves 42 and 43. This will cause the dispenser P to start operating, delivering the liquid drying agent N drop-by-drop to the pump. The proportion of this agent to the incoming rinse water $F^1$ is controlled by regulating the valve 46.

As previously pointed out, if the check valve 43 were not provided, there would be a steady pull on the drying agent, causing the latter to flow in a stream. By allowing air to enter through the branch leg 44, the drying agent is permitted to drip from the dispenser.

It will be noticed that a spring-seated relief valve 47 is provided between the inlet port 23 and the outlet port 24 of the pump, in the usual manner, so that water may be by-passed from the former to the latter, in the event that excess water pressure should develop in the pipe 15, which could not be handled by the pump.

We claim:

1. The combination with a dishwashing machine defining a rinse compartment; rinse-spray nozzles positioned in said compartment; and a hot water inlet pipe coupled to said nozzles to deliver rinse water thereto; of a motor-driven pump providing a mixing chamber; a branch pipe connected to said inlet pipe to deliver part of the hot rinse water to the mixing chamber; a pressure switch coupled to said inlet pipe, and being operable to connect the motor to a source of electrical energy, when the switch is closed by the pressure of said water; a dispenser defining a reservoir containing a non-sudsing drying agent liquid; a drying agent feed pipe connected to the reservoir and to the mixing chamber of the pump to deliver said drying agent liquid from the reservoir to the mixing chamber; a water-feed adjustment coupled into said branch pipe to restrict inflow of rinse water to the mixing chamber, and thereby create a differential pressure between said branch pipe and the drying agent feed pipe to thereby establish suction in the latter pipe; and an outflow pipe extending from an outlet of the mixing chamber to the rinse-spray nozzles to deliver a mixture of the hot rinse water and the drying agent liquid to said nozzles.

2. The combination with a dishwashing machine defining a rinse compartment; rinse-spray nozzles positioned in said compartment; and a hot water inlet pipe coupled to said nozzles to deliver rinse water thereto; of a motor-driven pump providing a mixing chamber; a branch pipe connected to said inlet pipe and to the pump chamber to deliver part of the hot rinse water to the mixing chamber of the pump; a dispenser defining a reservoir containing a non-sudsing drying agent liquid; a drying agent feed pipe connected to the reservoir and to the mixing chamber of the pump to deliver said drying agent liquid from the reservoir directly to the mixing chamber; a water-feed adjustment coupled into said branch pipe between the hot water inlet pipe and mixing chamber of the pump and operable to restrict inflow of rinse water to the mixing chamber, and thereby create a differential pressure between said branch pipe and the drying agent feed pipe to thereby establish suction in the latter pipe; and an outflow pipe extending from an outlet of the mixing chamber of the pump to the rinse-spray nozzles to deliver a mixture of the hot rinse water and the drying agent liquid to said nozzles.

3. The combination with a dishwashing machine defining a rinse compartment; rinse-spray nozzles positioned in said compartment; and a hot water inlet pipe coupled to said nozzles to deliver rinse water thereto; of a motor-driven pump providing a mixing chamber; a branch pipe connected to said inlet pipe to deliver part of the hot rinse water to the mixing chamber; a dispenser defining a reservoir containing a non-sudsing drying agent liquid; a drying agent feed pipe connected to the reservoir and to the mixing chamber of the pump to deliver said drying agent liquid from the reservoir to the mixing chamber; a water-feed adjustment coupled into said branch pipe to restrict inflow of rinse water to the mixing chamber, and thereby create a differential pressure between said branch pipe and the drying agent feed pipe to thereby establish suction in the latter pipe; and an outflow pipe extending from an outlet of the mixing chamber to the rinse-spray nozzles to deliver a mixture of the hot rinse water and the drying agent liquid to said nozzles; and means operable to admit air into the drying agent feed pipe to reduce the suction in this pipe to a point where the drying agent liquid will drip from the dispenser to the mixing chamber, rather than flow in a stream.

4. The combination with a dishwashing machine defining a rinse compartment; rinse-spray nozzles positioned in said compartment; and a hot water inlet pipe coupled to said nozzles to deliver rinse water thereto; of a motor-driven pump providing a mixing chamber; a branch pipe connected to said inlet pipe to deliver part of the hot rinse water to the mixing chamber; a dispenser defining a reservoir containing a non-sudsing drying agent liquid; a drying agent feed pipe connected to the reservoir and to the mixing chamber of the pump to deliver said drying agent liquid from the reservoir to the mixing chamber; a water-feed adjustment coupled into said branch pipe to restrict inflow of rinse water to the mixing chamber, and thereby create a differential pressure between said branch pipe and the drying agent feed pipe to thereby establish suction in the latter pipe; and an outflow pipe extending from an outlet of the mixing chamber to the rinse-spray nozzles to deliver a mixture of the hot rinse water and the drying agent liquid to said nozzles; and a fitting coupled into the drying agent feed pipe, and having a branch leg defining a passageway leading to the atmosphere; this passageway being provided with an air inlet check valve, which is arranged to be opened by suction established in said drying agent feed pipe by the pump, thereby reducing this suction to a point where the drying agent liquid will drip from the dispenser to the mixing chamber, rather than flow in a stream.

References Cited in the file of this patent

UNITED STATES PATENTS

| | | |
|---|---|---|
| 1,887,985 | Auker | Nov. 15, 1932 |
| 2,057,286 | Ash | Oct. 13, 1936 |
| 2,203,980 | Burt | June 11, 1940 |
| 2,393,464 | Granberg | Jan. 22, 1946 |